United States Patent
Uno

(10) Patent No.: US 7,636,928 B2
(45) Date of Patent: Dec. 22, 2009

(54) IMAGE PROCESSING DEVICE AND METHOD FOR PRESENTING PROGRAM SUMMARIES DURING CM BROADCASTS

(75) Inventor: Hiroaki Uno, Tokyo (JP)

(73) Assignee: Sony Corporation, Tokyo (JP)

( * ) Notice: Subject to any disclaimer, the term of this patent is extended or adjusted under 35 U.S.C. 154(b) by 436 days.

(21) Appl. No.: 11/477,044

(22) Filed: Jun. 28, 2006

(65) Prior Publication Data

US 2007/0006263 A1   Jan. 4, 2007

(30) Foreign Application Priority Data

Jun. 30, 2005   (JP) .............................. 2005-191716

(51) Int. Cl.
- *G06F 3/00*   (2006.01)
- *G06F 13/00*   (2006.01)
- *H04N 5/445*   (2006.01)

(52) U.S. Cl. .............................. 725/42; 725/38; 725/41; 725/61; 348/328; 386/65; 386/52

(58) Field of Classification Search .................. 725/34, 725/35, 36, 38, 58, 42
See application file for complete search history.

(56) References Cited

U.S. PATENT DOCUMENTS

| | | | | |
|---|---|---|---|---|
| 5,446,919 A | * | 8/1995 | Wilkins | 725/35 |
| 6,219,837 B1 | * | 4/2001 | Yeo et al. | 725/38 |
| 6,236,395 B1 | * | 5/2001 | Sezan et al. | 715/723 |
| 6,493,005 B1 | * | 12/2002 | Wu | 715/804 |
| 6,591,058 B1 | * | 7/2003 | O'Connor et al. | 386/65 |
| 7,013,477 B2 | * | 3/2006 | Nakamura et al. | 725/32 |
| 2006/0271980 A1 | * | 11/2006 | Mankovitz | 725/90 |
| 2008/0040740 A1 | * | 2/2008 | Plotnick et al. | 725/32 |

FOREIGN PATENT DOCUMENTS

| | | |
|---|---|---|
| JP | 10-243307 | 9/1998 |
| JP | 2000-11545 | 1/2000 |
| JP | 2000-57749 | 2/2000 |
| JP | 3064254 | 5/2000 |
| JP | 2002 57956 | 2/2002 |
| JP | 2004 186942 | 7/2004 |
| JP | 2004 266769 | 9/2004 |
| JP | 2004 363774 | 12/2004 |

* cited by examiner

*Primary Examiner*—Scott Beliveau
*Assistant Examiner*—Christine Kurien
(74) *Attorney, Agent, or Firm*—Frommer Lawrence & Haug LLP; William S. Frommer; Thomas F. Presson

(57) ABSTRACT

An electronic device comprising a reception unit configured to receive a television broadcast including a television-program broadcast and a plurality of commercial-message broadcast transmitted during the television-program broadcast. A detecting unit detects whether a commercial-message broadcast is included in the received television broadcast. A recording unit records an image of the received television-program broadcast according to the detecting. A display-control unit produces the image of the received television broadcast and produces a summary image for a predetermined display time during reception of the commercial-message broadcast.

20 Claims, 8 Drawing Sheets

IMAGE PROCESSING DEVICE AND METHOD FOR PRESENTING PROGRAM SUMMARIES DURING CM BROADCASTS

CROSS REFERENCES TO RELATED APPLICATIONS

The present invention contains subject matter related to Japanese Patent Application JP 2005-191716 filed in the Japanese Patent Office on Jun. 30, 2005, the entire contents of which are incorporated herein by reference.

BACKGROUND OF THE INVENTION

1. Field of the Invention

The present invention relates to an electronic device, an image-processing device, and an image-processing method that can control production of an image of a television (TV) broadcast.

2. Description of the Related Art

If a user searches for a TV program he/she wishes to watch by using a TV receiver or the like, the user searches for the TV program by seeing a known program list shown on a newspaper, a magazine, an electronic program guide (EPG), and so forth. Recently, however, the TV receiver acquires the EPG through the Internet and/or a broadcast wave, and makes a search by using information about the genre and/or keyword of a program.

However, it remains usual that the user makes the search by performing zapping. The term "zapping" means that the user switches between a plurality of channels by operating a remote controller in front of the TV receiver. The zapping is considered to be useful due to the following reasons. Namely, it is considered that the user can understand arranged information about channels, a time slot, and program contents by using the newspaper, the EPG, and so forth. Further, if a little time is left for making the search, it is also considered that a program which is going to be seen by the user can be found and understood immediately by actually seeing information about the program.

However, there is a defect in making the search by performing the zapping. Namely, if the user tunes from one channel to another channel on which a commercial-message (hereinafter referred to as a CM) broadcast is currently transmitted, the user has to wait till the CM broadcast is finished, so as to know the program contents. In other words, the waiting time is wasted. Therefore, there has been proposed a technology for automatically producing images accumulated on a image-signal-output device other than the TV receiver while the CM broadcast is transmitted, where the image-signal-output devices includes a video-tape recorder, an optical-disk device, and so forth. The above-described technology is disclosed in Japanese Unexamined Patent Application Publication No. 10-243307 (refer to paragraph 0005, FIG. 1, and so forth).

SUMMARY OF THE INVENTION

However, according to the technology disclosed in Japanese Unexamined Patent Application Publication No. 10-243307, the images produced while the CM broadcast is transmitted do not relate to the contents of a program broadcasted before the CM is broadcasted. Therefore, the above-described technology is convenient for a user who had been watching the program until then, so as to make effective use of the CM-broadcast time. However, since it is difficult to know program contents by seeing the images produced during the CM broadcast, the above-described technology is not helpful for a user who performs zapping, so as to search for a desirable program.

Accordingly, the present invention provides an electronic device, an image-processing device, and an image-processing method that can inform a user of contents of a program while a CM is broadcasted, where the program was broadcasted before the CM is broadcasted.

Therefore, an electronic device according to an embodiment of the present invention includes a reception unit configured to receive a television broadcast including a television-program broadcast and a commercial-message broadcast transmitted during the television-program broadcast, a determination unit configured to determine to which of the television-program broadcast and the commercial-message broadcast does the received television broadcast correspond, a recording unit configured to record an image of the received television-program broadcast according to the determination, and a display-control unit that can produce the image of the received television broadcast and that performs control so that at least a single part of the recorded image is produced on the basis of the determination during reception of the commercial-message broadcast on the basis of the determination.

Here, the electronic device includes a TV receiver, a recording-and-reproducing device using a recording medium, such as a hard-disk drive (HDD), a personal computer (PC), and so forth. The display-control unit is configured to perform control, so as to output the above-described image on a display unit including a liquid-crystal display (LCD), an organic electroluminescence (EL) display, a plasma display, a field-emission display (FED), a cathode-ray tube (CRT), and so forth. Although the electronic device may include the display unit, as is the case with the TV receiver, the electronic device may not include the display unit, as is the case with the recording-and-reproducing device. In that case, the electronic device may output the image to the display unit. According to the above-described configuration, even though the user tunes from one channel to another channel on which a CM is currently broadcasted, at least one part of the recorded image is produced. Therefore, it becomes possible for the user to know the contents of a program immediately, where the program was broadcasted before the CM is broadcasted. Subsequently, the user can select a channel in a short time without waiting till the CM broadcast is finished. Further, the user can easily search for programs on all channels by performing zapping irrespective of to which of the TV-program broadcast and the CM broadcast does the TV broadcast correspond.

According to another embodiment of the present invention, the reception means may receive the commercial-message broadcast a plurality of times during the television-program broadcast, and the display-control unit may perform control, so as to produce at least a single part of an image of the television-program broadcast received between first and second commercial-message broadcasts of the received commercial-message broadcasts, where the first commercial-message broadcast is currently received and the second commercial-message broadcast precedes the first commercial-message broadcast. Subsequently, since the at least one part of the contents of the program that was broadcasted immediately before the commercial-message broadcast is produced, it becomes possible to show program contents close to those broadcasted after the commercial-message broadcast is finished so that the user can select a program with increased convenience.

According to another embodiment of the present invention, the electronic device may further include a generation unit configured to generate a summary image obtained by summarizing the image of the television-program broadcast received between the second and first commercial-message broadcasts on the basis of the recorded image. Further, the display-control unit may perform control, so as to produce the generated summary image. Subsequently, it becomes possible to show the contents of the program that was broadcasted immediately before the commercial-message broadcast which is currently transmitted, as the summary image, which is easy to understand. Thus, the user can easily understand contents of the preceding program.

According to another embodiment of the present invention, the summary image may include video obtained by extracting the image of the television-program broadcast received between the second and first commercial-message broadcasts at predetermined time intervals and joining the extracted images to each other. Subsequently, contents of a program broadcasted between the second and first commercial-message broadcasts can be produced by performing so-called frame feeding of video, and the user can easily understand the program contents by seeing the frame-feed images. The predetermined time intervals denote several seconds, for example (three to five seconds, for example) so that the video corresponding to the several seconds is continuously produced a plurality of times.

According to another embodiment of the present invention, the generation means may include a unit configured to extract part of each of the extracted images, as a still image, and a unit configured to downsize each of the extracted still images. Further, the display-control unit may perform control so that the downsized still images are arranged and produced. Subsequently, the part of the video of the frame-feed images can be produced at one time, as the still images, so that the user can immediately understand the contents of the program broadcasted between the second and first commercial-message broadcasts. The above-described configuration is effective especially when it takes a long time to broadcast the program between the second and first commercial-message broadcasts.

In that case, the display-control unit may perform control so that the downsized still images are arranged and produced in matrix form. Subsequently, it becomes possible to produce many still images at one time so that the user can easily understand the program contents.

In the electronic device, the recording unit may include a unit configured to record speech of the television-program broadcast, and the generation unit may include a unit configured to identify program contents of the television-program broadcast on the basis of at least one of the recorded image and the recorded speech, and a unit configured to generate the summary image on the basis of the identification.

The identification is performed by using methods of image identification, speech identification, character identification, and so forth in combination with one another, so as to understand an event, a change in the story, a character, a change in the footage, and so forth of a program. If the above-described TV broadcast presents a soccer-game televised program, images showing a goal net swayed by a ball are detected through the image identification and the speech "goal" is detected through the speech identification. Then, a result of the above-described detection is combined with knowledge that had been acquired so that a goal scene is identified. For example, the above-described knowledge includes knowledge about a camera work. According to the camera-work knowledge, telop data on score information is largely shown at the center of a screen image immediately after a score is made, the scene of players and a manager in exultation zooms in, and a replay of the goal scene is shown, for example. Subsequently, it becomes possible to summarize the program contents faithfully so that the user can correctly understand the program contents.

In the electronic device according to another embodiment of the present invention, the display-control unit may perform control so that an image of the commercial-message broadcast which is currently received and the recorded image are produced at the same time. When the above-described images are produced at the same time, two screen images are shown, for example, so that the user understand that the commercial-message broadcast is currently transmitted. Further, the user can understand the contents of the preceding program while seeing the image of the commercial-message broadcast.

Further, in that case, the display-control unit may perform control so that a display image showing the recorded image is faded out as the currently received commercial-message broadcast is finished and the television-program broadcast is restarted. Subsequently, it becomes possible to produce the recorded image, so as to inform the user of the contents of the preceding program after the television-program broadcast is restarted. Further, the user can shift to the restarted television-program broadcast without stress.

According to another embodiment of the present invention, in the electronic device, the display-control unit may perform control so that the produced image is switched to an image of the television-program broadcast which is restarted at the same time as when the currently received commercial-message broadcast is finished and the television-program broadcast is restarted. Subsequently, it becomes possible to inform the user of the contents of the preceding program by using the commercial-message-broadcast time. Further, when the commercial-message broadcast is finished and the television-program broadcast is restarted, it becomes possible to link the image of the preceding program to that of the restarted television-program broadcast.

According to another embodiment of the present invention, in the electronic device, the display-control unit may perform control so that after a predetermined time elapses since the currently received commercial-message broadcast is finished and the television-program broadcast is restarted, the produced image is switched to an image of the restarted television-program broadcast. The predetermined time may be five seconds or ten seconds, for example. Thus, it becomes possible to inform the user of the contents of the preceding program with reliability by producing the recorded image over the predetermined time even after the television-program broadcast is restarted.

According to another embodiment of the present invention, in the electronic device, the reception unit may receive a first-channel television broadcast and a second-channel television broadcast, and the display-control unit may perform control so that a produced image is switched between the first-channel television broadcast and the second-channel television broadcast. Further, the electronic device may further include a unit which stores information about time where a commercial-message broadcast is finished in advance, the commercial-message broadcast being scheduled to be performed on the first channel and/or the second channel. Still further, when a display channel is switched from the first channel to the second channel by the display-control unit and the commercial-message broadcast is received on the second channel, the generation unit may generate the summary image from the recorded image on the basis of the stored finish-time information, where the summary image corresponds to a time period from the channel switch to the finish time. Subsequently, if the user tunes from one channel to another channel on which a CM is currently broadcasted, it becomes possible to generate the summary image according to the time remaining for the commercial-message broadcast. Therefore, if the user tunes from one channel to the second channel on which the commercial message is currently broadcasted, it becomes possible to inform the user of the contents of the preceding program with reliability irrespective of the tuning timing.

In the electronic device, the display-control unit may perform control so that text information and/or image information is further produced, where the text information and/or the image information indicates that the recorded image is currently produced. Subsequently, if the user tunes from one channel to another channel on which the above-described recorded image is currently broadcasted, the user can understand that the commercial-message broadcast is currently transmitted and see the contents of the preceding program without confusing the recorded image with an image of the commercial-message broadcast.

An image-processing device according to another embodiment of the present invention includes a reception unit configured to receive an image of a television broadcast received by a reception device configured to receive the television broadcast and perform display control, the television broadcast including a television-program broadcast and a commercial-message broadcast transmitted during the television-program broadcast, a determination unit configured to determine to which of the television-program broadcast and the commercial-message broadcast does the received image correspond, a recording unit configured to record the image of the received television-program broadcast according to the determination, and a transmission unit configured to transmit at least a single part of the recorded image to the reception device on the basis of the determination so that the reception device produces the single part while receiving the commercial-message broadcast.

The image-processing device may be, for example, a server (PC) connected to a device having a broadcast-reception function, such as a TV receiver, an HDD recording-and-reproducing device, and so forth. Subsequently, if the user tunes from one channel to another channel on which a CM is currently broadcasted, at least a single part of the image stored in the reception device can be produced. Therefore, the user can immediately see the contents of a program that was broadcasted before the commercial message is broadcasted. Subsequently, the user can select a channel in a short time without waiting till the CM broadcast is finished. Further, the user can easily search for programs on all channels for performing zapping irrespective of to which of the TV-program broadcast and the CM broadcast does the TV broadcast correspond.

An image-processing method according to another embodiment of the present invention includes the steps of receiving a television broadcast including a television-program broadcast and a commercial-message broadcast transmitted during the television-program broadcast, determining to which of the television-program broadcast and the commercial-message broadcast does the received television broadcast correspond, recording an image of the received television-program broadcast according to the determination, and performing control so that at least a single part of the recorded image is produced during reception of the commercial-message broadcast on the basis of the determination.

An electronic device according to another embodiment of the present invention includes a reception unit configured to receive a signal including a program and a commercial message inserted into the program, a determination unit configured to determine to which of the program and the commercial message does the received signal correspond, a recording unit configured to record an image signal of the received program on the basis of the determination, and a display-control unit that can perform display control for the received image signal and perform control so that at least a single part of the recorded image signal is produced during reception of the commercial message on the basis of the determination.

The present invention allows for informing a user of contents of a program while a CM is broadcasted, where the program was broadcasted before the CM is broadcasted.

DESCRIPTION OF THE PREFERRED EMBODIMENTS

Figure 1:
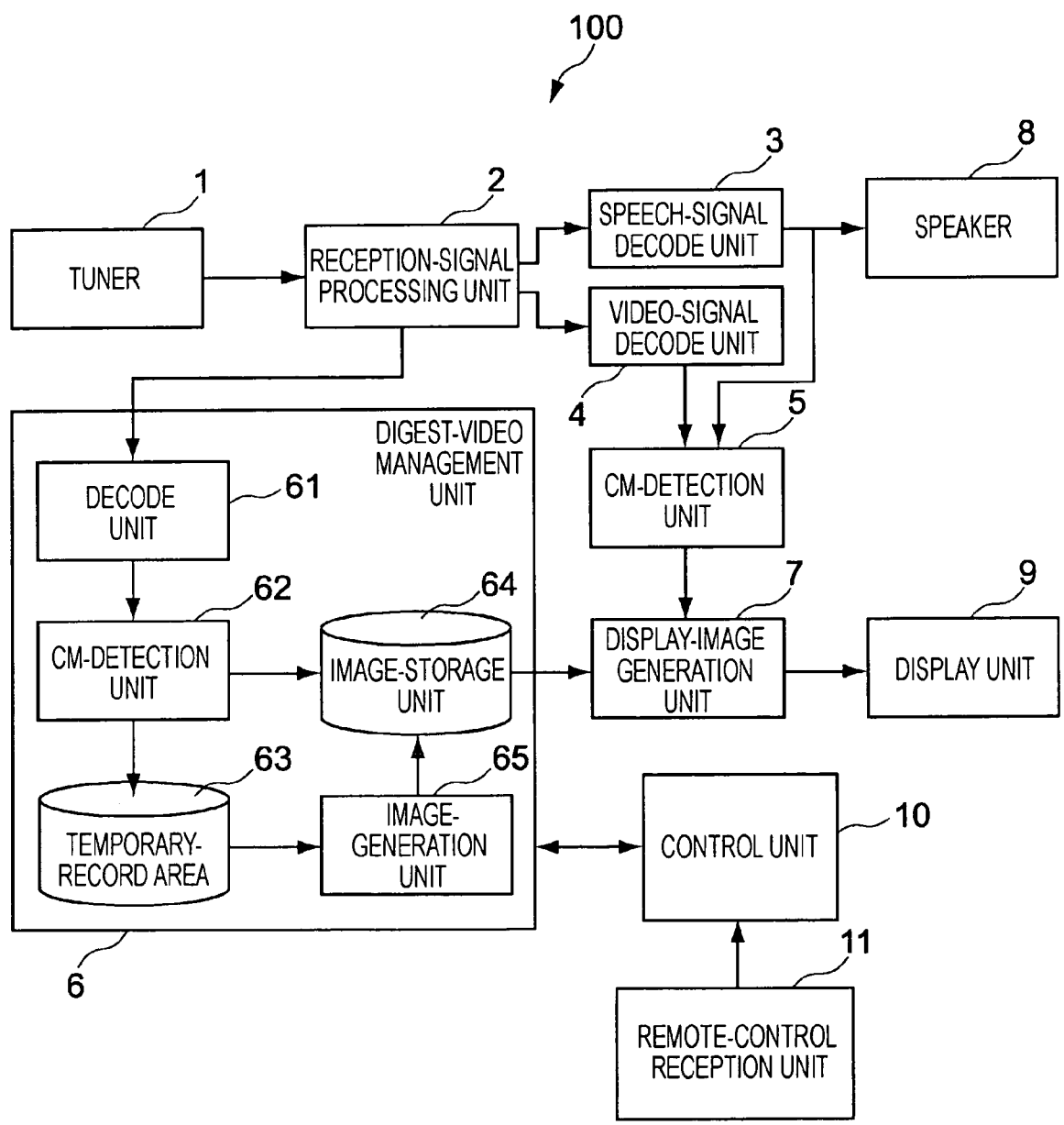
FIG. 1 shows the configuration of a TV receiver according to an embodiment of the present invention.

Hereinafter, embodiments of the present invention will be described with reference to the attached drawings. FIG. 1 shows the configuration of a television (TV) receiver 100 according to an embodiment of the present invention. As shown in FIG. 1, the TV receiver 100 includes a tuner 1, a reception-signal processing unit 2, a speech-signal decode unit 3, a image-signal decode unit 4, a commercial-message (CM) detection unit 5, a digest-image management unit 6, a display-image generation unit 7, a speaker 8, a display unit 9, a control unit 10, and a remote-control photoreceptor unit 11.

The tuner 1 receives a digital-broadcast signal transmitted from a broadcast station via an antenna (not shown), the reception-signal processing unit 2 receives and divides the broadcast signal transmitted to the tuner 1 into a speech signal and an image signal. Then, the reception-signal processing unit 2 transmits the speech signal to the speech-signal decode unit 3 and transmits the image signal to the image-signal decode unit 4. In the above-described embodiment, the TV receiver 100 includes a plurality of the tuners 1, so as to receive broadcast signals of at least two channels at one time. It is preferable that the TV receiver 100 have the tuners corresponding to channels on which commercial messages are broadcasted. Although a digital broadcast is transmitted in the above-descried embodiment, an analog broadcast may be transmitted.

The remote-control photoreceptor unit 11 receives an input signal or the like used for selecting a channel, the input signal being transmitted from a remote controller (not shown) or the like of a user, and transmits the input signal to the control unit 10. The speech-signal decode unit 3 receives a speech signal transmitted from the reception-signal processing unit 2, the speech signal corresponding to a channel selected by the user, and decodes the speech signal into speech on the basis of the input signal transmitted from the remote-control photoreceptor unit 11. The decoded speech signal is transmitted from the speaker 8. The image-signal decode unit 4 receives a broadcast signal of the channel selected by the user, the broadcast signal being transmitted from the reception-signal processing unit 2, and decodes the broadcast signal into an image on the basis of the input signal transmitted to the remote-control photoreceptor unit 11.

Upon receiving the decoded speech signal and image signal, the CM-detection unit 5 detects whether or not the image signal is an image signal of the CM broadcast. The CM detection is performed, as below. For example, a change in the speech-signal format (monophonic/stereo/multiplex) is detected and the position where the change is found is determined to be a point where the broadcast is switched from a program to a CM. Otherwise, the CM detection may also be performed by detecting a voiceless section by seeing the envelope (waveform) of the speech signal and determining the voiceless section to be the point where the broadcast is switched from the program to the CM. Further, a scene-change point may be detected by calculating the absolute value of a difference of each frame and/or a field of the image signal so that the scene-change point is determined to be the point where the broadcast is switched from the program to the CM. The CM detection may be performed by using any method other than the above-described methods.

Upon receiving the broadcast signal transmitted from the reception-signal processing unit 2, the digest-image management unit 6 generates and stores the digest image corresponding to the contents of a program, where the program was broadcasted before a CM is broadcasted at some midpoint in the program. The digest-image management unit 6 includes a decode unit 61, a CM-detection unit 62, a temporary-record unit 63, an image-storage unit 64, and an image-generation unit 65.

The decode unit 61 decodes a broadcast signal of each channel, the broadcast signal being transmitted from the reception-signal processing unit 2. A broadcast signal used for the digital broadcast includes a data signal and/or a service-information (SI)/program-specific-information (PSI) signal in addition to the speech-signal and the image signal. The data signal and/or the SI/PSI signal includes electronic-program-guide (EPG) data. The decode unit 61 decodes the EPG data and records the EPG data onto the temporary-record area 63. The CM-detection unit 62 has the same function as that of the CM-detection unit 5. Upon getting feedback from the CM-detection unit 5, the CM-detection unit 62 detects a CM for each channel in synchronization with the progress of the program broadcast and records the program image between CMs onto the temporary-record area 63. The image-generation unit 65 generates digest images on the basis of the temporarily recorded image, arranges the digest images according to the channels, and stores the digest images. Further, upon getting feedback from the CM-detection unit 62, the digest image is updated on the basis of a new CM detected by the CM-detection unit 62.

The digest image used in the above-described embodiment denotes at least a single part of images of a program broadcasted between the currently-broadcasted CM and the previous CM. Further, the digest image also includes video obtained by summarizing and editing a plurality of images extracted from the images of the program every few seconds, the still images corresponding to a plurality of scenes, video obtained by extracting part (several tens of seconds) of images of the program, and so forth. The details on the digest image will be described later.

The display-image generation unit 7 generates a display image by using the digest image generated and stored by the digest-image management unit 6 in combination with an actual broadcast image, or the digest image alone. Further, the display-image generation unit 7 controls the display unit 9 so that the display unit 9 generates the display image. The display unit 9 includes a liquid-crystal display (LCD), an organic electroluminescence (EL) display, a plasma display, a field-emission display (FED), a cathode-ray tube (CRT), and so forth.

The control unit 10 includes a central processing unit (CPU), a read-only memory (ROM), a random-access memory (RAM), and so forth. The control unit 10 controls operations of the entire TV receiver 100, inputs information about a remote-control operation performed by the user via the remote-control photoreceptor unit 11, and transmits an instruction about processing to each of the units of the TV receiver 100.

Next, operations of the TV receiver 100 according to the above-described embodiment will be described.

Figure 2:
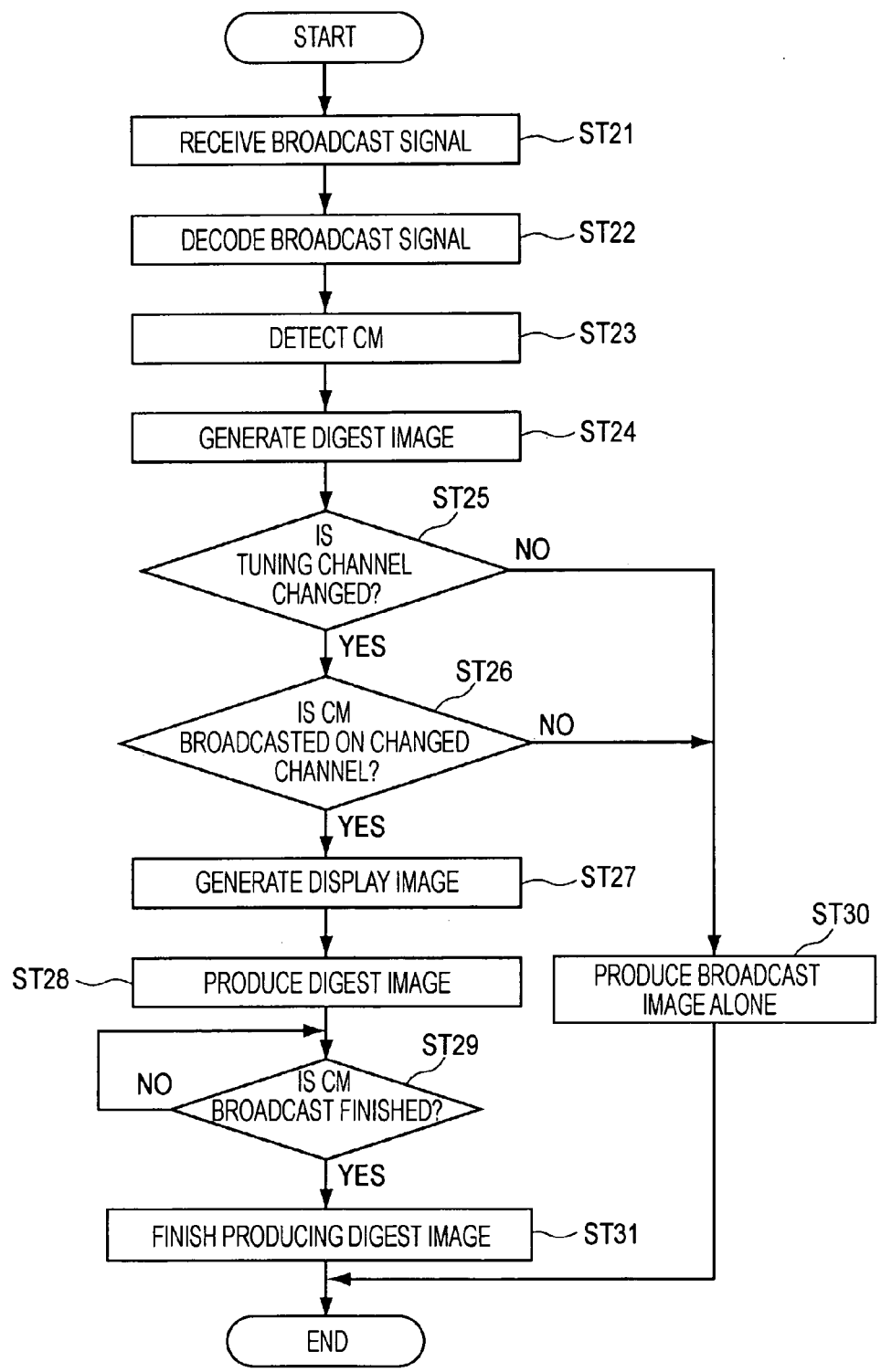
FIG. 2 is a flowchart showing the flow of operations performed by the TV receiver, so as to produce a digest image.

FIG. 2 is a flowchart showing the flow of operations performed by the TV receiver 100, so as to produce the digest image. As shown in FIG. 2, the tuner 1 receives and transmits a broadcast signal to the reception-signal processing unit 2 (step ST21). Then, each of the speech-signal decode unit 3 and the image-signal decode unit 4 performs decoding, the CM-detection unit 5 performs CM detection, and the above-described broadcast signal is transmitted to the digest-image management unit 6. First, in the digest-image management unit 6, the decode unit 61 decodes the broadcast signal (step ST22). Then, CMs are detected from the broadcast signal according to the feedback from the CM-detection unit 5 (step ST23), and a program image broadcasted between the CMs is recorded onto the temporary-record area 63. After that, the image-generation unit 65 generates a digest image on the basis of the recorded program image (step ST24), and stores the digest image into the image-storage unit 64.

Figure 3:
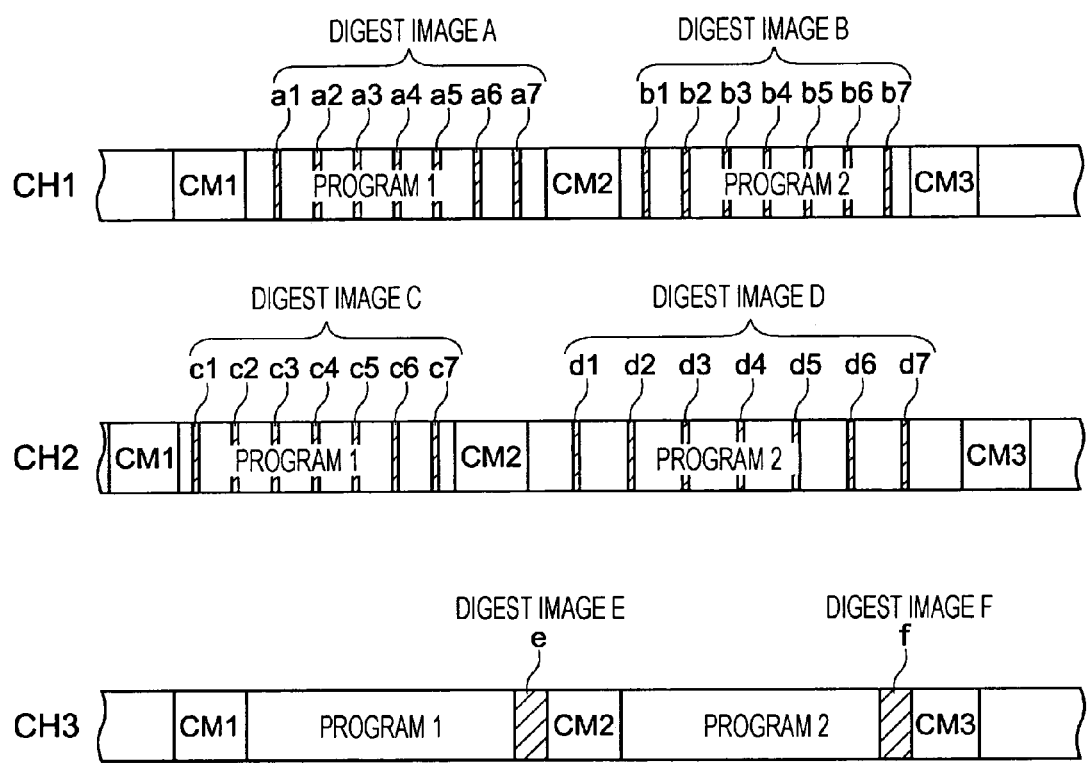
FIG. 3 shows conceptual processing performed for generating the digest image.

Hereinafter, details on processing performed for generating the digest image will be described. FIG. 3 illustrates conceptual processing performed for generating the digest image.

As described above, the digest image of the above-described embodiment includes the video obtained by summarizing and editing the plurality of images extracted from the images of the program every few seconds, as frame-feed video, the still images of the plurality of scenes, the video obtained by extracting part (corresponding to several tens of seconds, for example) of the images of the program, and so forth. The details on the digest image will be described later.

First, when images are extracted from the images of the program every few seconds by using a channel 1 shown in FIG. 3, for example, video is extracted from images of a program 1 every five seconds or so, the images being broadcasted between CMs 1 and 2. More specifically, the video corresponding to seven parts a1, a2, a3, a4, a5, a6, and a7 is extracted. The extracted video images are joined to one another in the order of broadcast and referred to as a digest image A. In the case of a program 2 broadcasted between the CM 2 and a CM 3, the video images corresponding to parts b1, b2, b3, b4, b5, b6, and b7 are also extracted, joined to one another, and referred to as a digest image B. As described above, the digest image A is stored in the image-storage unit 64 till the program 1 is finished. However, when the program 2 is finished and the digest image B is generated, the digest image A is updated to the digest image B.

Figure 4:
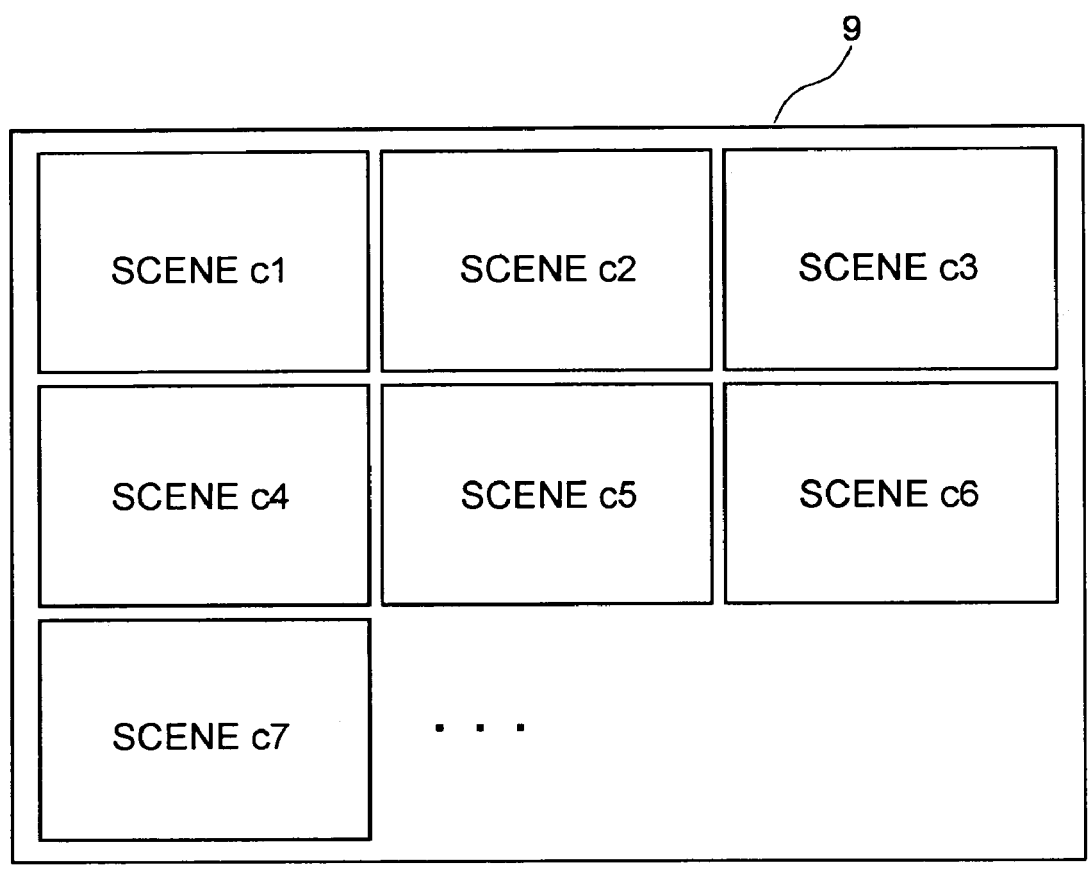
FIG. 4 shows an example list of still images, the list being generated, as the digest image.

The following processing procedures are performed, so as to extract still images of a plurality of scenes. For example, when the channel 2 shown in FIG. 3 is selected, video is extracted from images of the program 1 every few seconds (c1 to c7), as is the case with the digest images A and B, where the images are broadcasted between the CMs 1 and 2. After that, a single scene of the video (for example, the first frame of each video) is extracted, as a still image. A plurality of the still images arranged in a matrix form or the like is determined to be a digest image C. FIG. 4 shows an example of the digest image C. The still images of the scenes are arranged in three rows and three columns, for example. However, the still images may be arranged without being limited to the above-described embodiment. Further, the number of the extracted still images may be increased and screen images arranged in the matrix form may be produced, as frame-feed images. In the case where the program 2 is broadcasted, a digest image D is generated, as is the case with the above-described embodiment, and the image-storage unit 64 updates the digest image C to the digest image D.

Further, when extracting part of images of a program, as it is, the following processing procedures are performed. For example, when the channel 3 shown in FIG. 3 is selected, the image e corresponding to the last ten seconds of the program 1 broadcasted between the CMs 1 and 2 is extracted and determined to be a digest image E. Similarly, a digest image F is generated from the program 2 broadcasted between the CMs 2 and 3, and the data stored in the image-storage unit 64 is updated.

Returning to the flowchart shown in FIG. 2, the digest image is generated in the above-described manner (step ST24). If the user tunes from one channel to another by operating the remote control or the like (YES at step ST25) and a CM is currently broadcasted on the tuned channel (step ST26), a display image is generated by using the digest image stored by the display-image generation unit 7 in combination with an actually broadcasted image (the CM image), or the digest image alone (step ST27), and the display unit 9 produces the generated display image (step ST28).

Figure 5A:
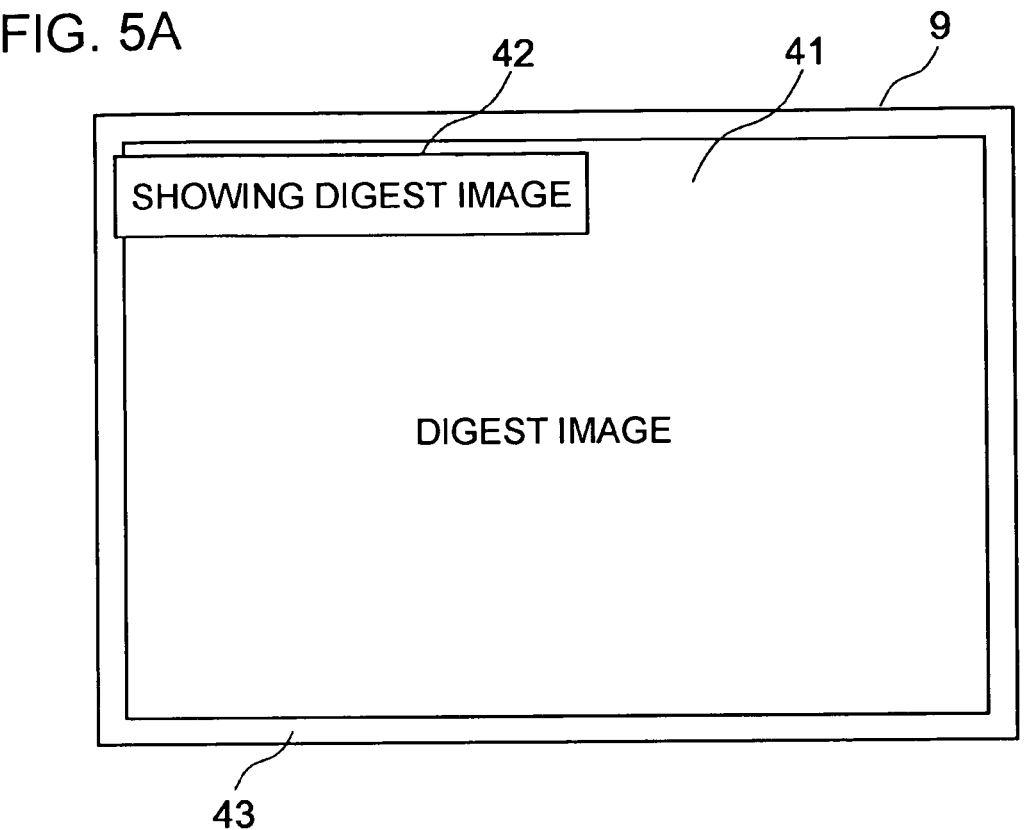
FIG. 5A shows an example where the digest image is produced by using an entire screen image.

FIG. 5A shows an example screen image produced by the display unit 9, the example screen image being produced, so as to show the digest image alone. In that case, text information (telop data 42) may be produced, so as to indicate that digest image 41 is currently produced, as shown in FIG. 5A. Otherwise, a colored window frame 43 indicating that the digest image is currently produced may be produced with or in place of the telop data 42.

Figure 5B:
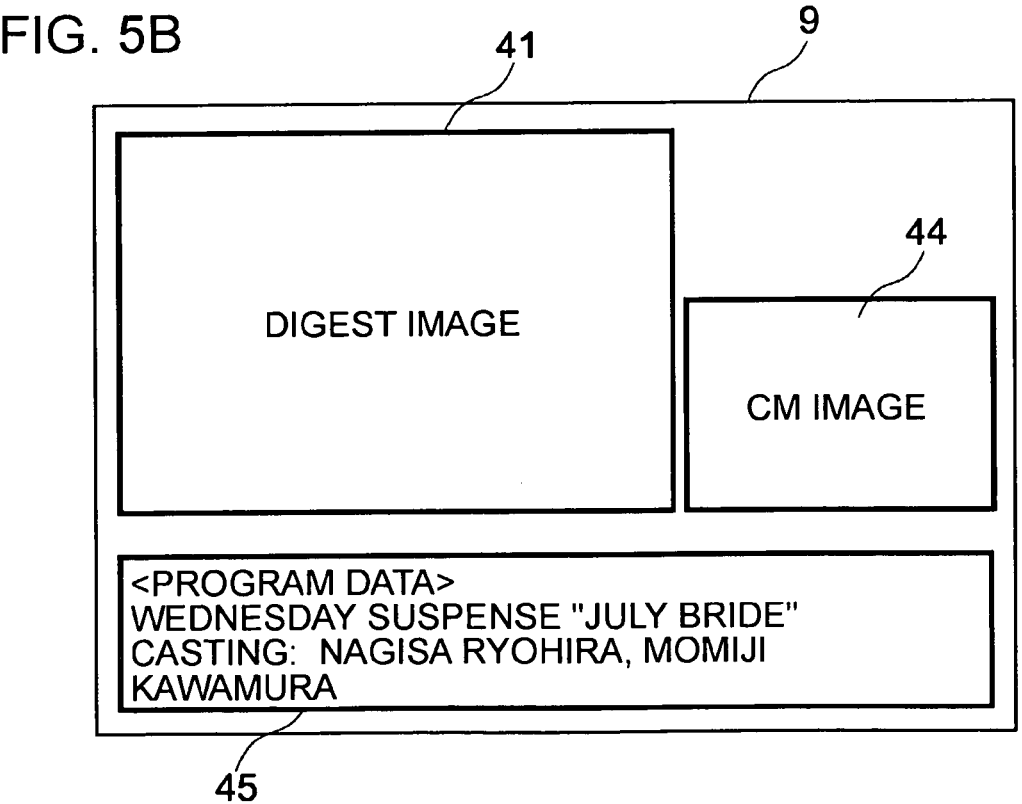
FIG. 5B shows an example where the digest image is produced by using two screen images.

FIG. 5B shows example screen images produced by the display 9, the example screen images being produced, so as to show the digest image and the broadcast image at the same time, as two screen images. When the digest image and the broadcast image are shown, as the two screen images, the digest image 41 is produced, as a screen image larger than that showing the broadcast image, that is, a CM image 44, as shown in FIG. 5B. Otherwise, program information 45 about a program currently broadcasted on the channel may be produced on the basis of EPG data acquired from the above-described broadcast signal by using blank space under the two screen images, for example.

For determining the display-time period of producing the digest image, there have been provided a fixed mode used for setting a fixed display-time period in advance and an automatic mode. If a user tunes from one channel to another in the case where the automatic mode is selected, the digest image is generated and produced according to the remaining time of a CM currently broadcasted on the tuned channel. If the fixed mode is selected, the digest image is generated according to the method shown in FIG. 3. Namely, the digest image is generated in units of twenty seconds, thirty seconds, and forty seconds, for example.

Figure 6:
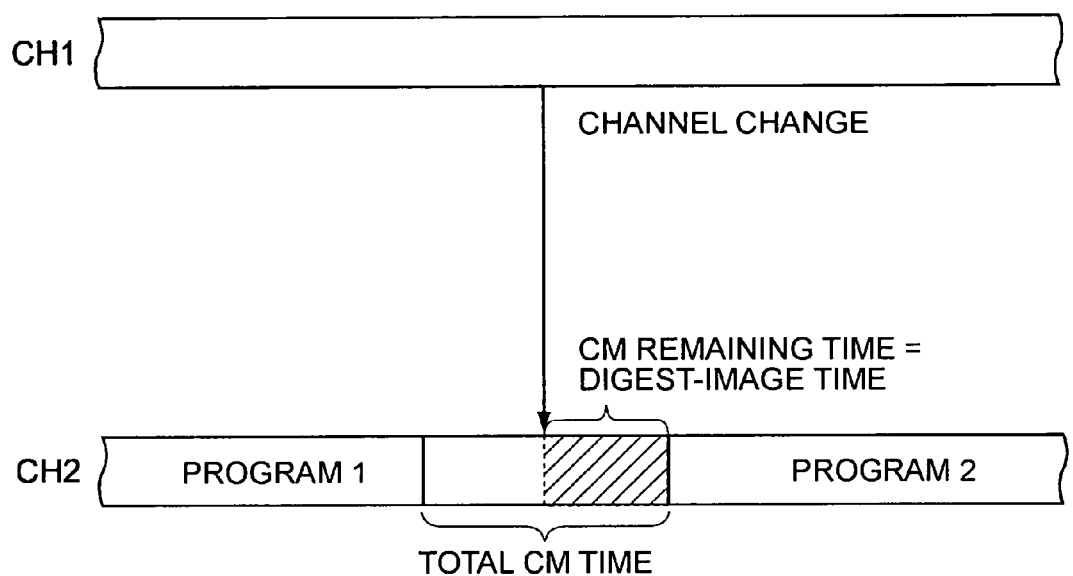
FIG. 6 shows conceptual processing performed for generating the digest image on the basis of CM-remaining time.

FIG. 6 shows conceptual processing performed for generating the digest image in the automatic mode. When the automatic mode is selected, information about the time where the CM broadcast is started and the time where the CM broadcast is finished is acquired from the acquired EPG data, where the CM is broadcasted during the program broadcast. The above-described time information is acquired for each of programs broadcasted on all channels and recorded onto the temporary-record area 63. Then, when the user tunes from a channel 1 to a channel 2, it is calculated how much time remains until a CM broadcast received on the channel 2 is finished by referring to information about the time where the CM broadcast is finished, as shown in FIG. 6. Then, the digest image corresponding to the remaining time is generated on the basis of images of the program 1 according to the same method as that shown in FIG. 3.

When the fixed mode is selected from among the above-described two modes, the digest image can be easily generated irrespective of the CM-remaining time or the like, so that the processing load on the CPU decreases. When the automatic mode is selected, it becomes possible to provide a highly convenient digest image which is started and/or finished according to the tune timing and/or CM-finishing time, even though the processing load on the CPU increases slightly.

Returning to the flowchart shown in FIG. 2, when the CM broadcast is finished after the digest image is produced in the above-described manner, the digest-image production is finished. The digest-image production may be finished in various patterns, as below.

First, when the digest image is produced in the automatic mode, the digest image is generated, so as to be finished at the time where the CM broadcast is finished. Therefore, the digest-image production is finished at the same time as when the CM broadcast is finished, and a broadcast image (the image of a program) is produced. Further, when the digest image is produced in the fixed mode, part of the above-described set time often remains after the CM broadcast is finished. In that case, therefore, the digest image is produced during such time which remains after the CM broadcast is finished, and the digest-image production is finished at the same time as when the set time elapses.

Figure 7:
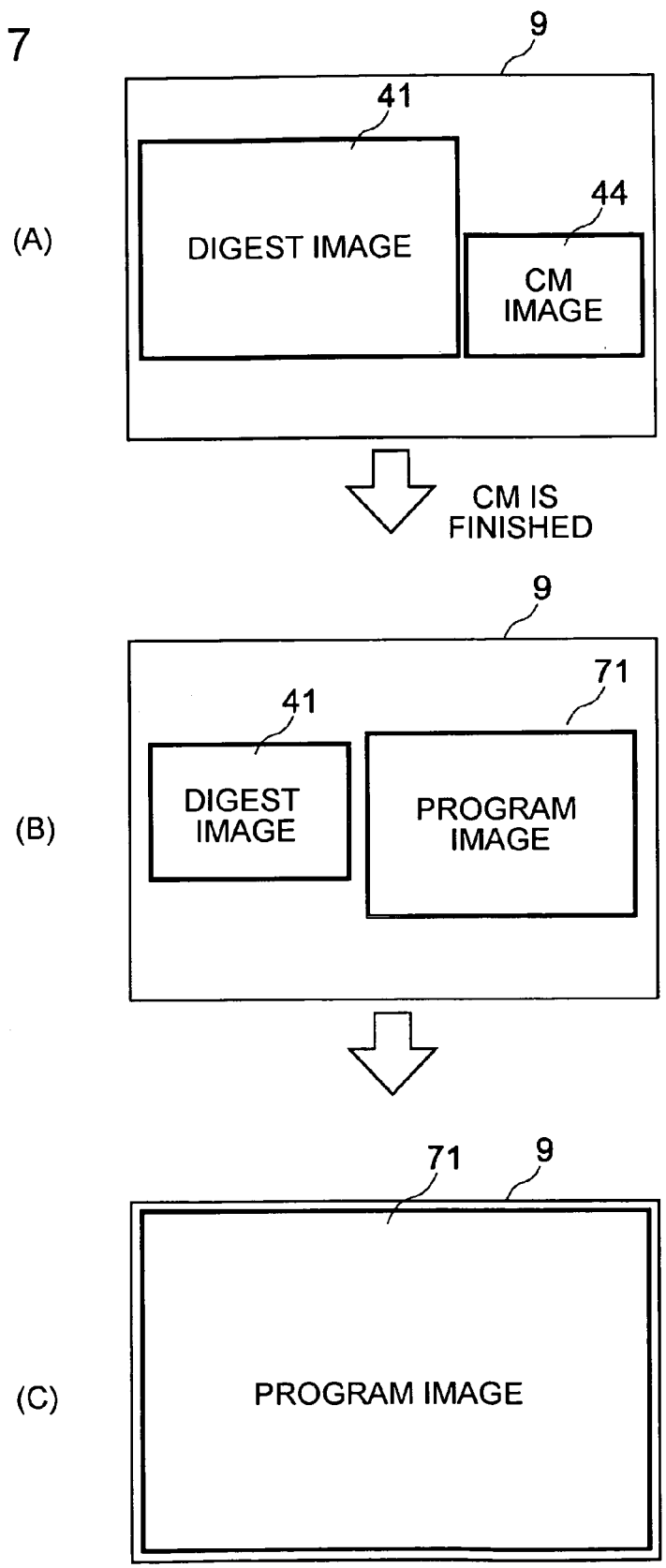
FIG. 7 shows how the produced digest image is faded out so that the digest-image production is finished.

When the two screen images are produced, the digest image may be faded out. FIG. 7 shows how the digest image produced on the screen image is faded out so that the digest-image production is finished. As shown in part (a) of FIG. 7, a display area showing the digest image 41 is larger than that showing the CM image 44. However, the size of the display area showing the digest image 41 is gradually decreased after the CM broadcast is finished, as shown in part (b) of FIG. 7, and the size of a display area showing a program image 71 in place of the finished CM video is gradually increased. Then, production of the digest image 41 is finished after predetermined time elapses and only the program image 71 is produced, as shown in part (c) of FIG. 7. Otherwise, the user may forcefully terminate the production of the digest image 41 by operating the remote control or the like.

Thus, the digest-image production is finished (step S31). The above-described processing is performed every time a CM is detected, or every time the user tunes from one channel to another channel on which a CM is currently broadcasted. Accordingly, if the user tunes from one channel to another channel on which a CM is broadcasted, it becomes possible to inform the user of the contents of a program broadcasted on the tuned channel by generating and producing the above-described digest image. Further, the user can select a channel with efficiency while making a zapping search.

Figure 8:
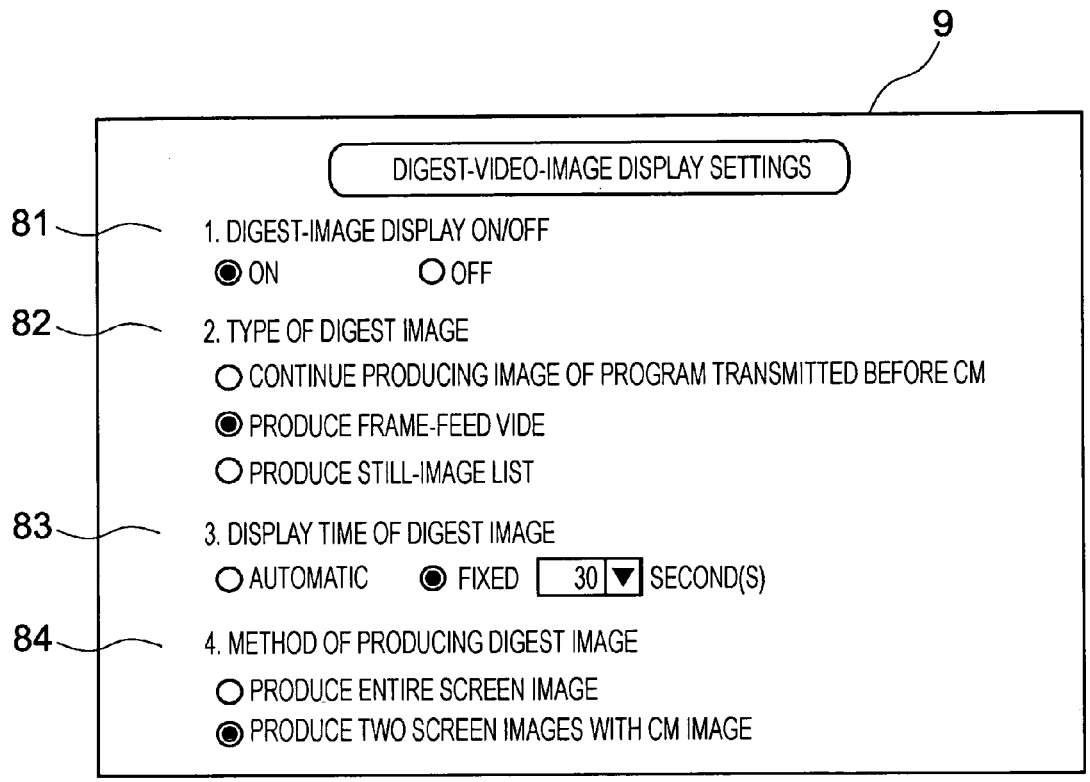
FIG. 8 shows an example screen image used for making settings on the digest-image production.

As has been described, there are provided several patterns of producing the digest image. However, the user may customize the patterns according to his/her preferences. FIG. 8 shows an example screen image used for making settings on the digest-image production.

In the digest-image-production-setting screen image shown in FIG. 8, a set item 81 indicating whether or not the digest image is produced, a set item 82 indicating the type of the digest image, a set item 83 indicating the production time of the digest image, and a set item 84 indicating the method of producing the digest image. The user can make the settings by marking a predetermined item selected from among the above-described items by operating the remote control or the like, for example. For fixing the settings on the digest-image production time, the fixed time can be selected from a pull-down menu, for example. The digest-image-production-setting screen image allows for producing a digest image according to the user's preferences.

The present invention can be achieved without being limited to the above-described embodiments and modified in various ways within the scope of the present invention.

According to the above-described embodiments, when images broadcasted immediately before a CM are produced, as the frame-feed video, the digest image is produced, as the still-image list. However, the digest image may be generated on the basis of predetermined information obtained by identifying the contents and meaning of a program. Subsequently, it becomes possible to summarize the program contents faithfully so that the user can correctly understand the program contents.

The identification is performed by using methods of image identification, speech identification, character identification, and so forth in combination with one another, so as to understand an event, a change in the story, a character, a change in the footage, and so forth of a program. If a soccer-game televised program is presented by the above-described TV broadcast, images showing a goal net swayed by a ball are detected by performing the image identification and the speech "goal" is detected by performing the speech identification. Then, a result of the above-described detection is combined with knowledge that had been acquired, so as to identify a goal scene. For example, the above-described knowledge includes knowledge about a camera work. According to the camera-work knowledge, telop data on score information is largely shown at the center of a screen image immediately after a score is made, the scene of players and a manager in exultation zooms in, and a replay of the goal scene is shown, for example.

Further, in the case of a base-ball televised program, the scene of a home run may be identified by detecting the image of a hurler and a batter, the image of a ball hit by the batter, the ball moving through the air, the image of stands, the image of a batter who passes the first base, the speech "home run" of a play-by-play announcer, telop data on score information, and so forth in synchronization with the scene transition. In the case of other sport programs, many images, speech-data items, and so forth that are specific to each of sports may be studied in advance, so as to identify a score scene or the like by performing pattern matching. Further, in the case of a drama program, the turn of a story can be identified by identifying a character and his lines. Subsequently, a summary of the story can be generated, as the digest image. When the above-described information is identified, information about a character, a story, an event, and so forth can be used, the information being included in the EPG data.

In the above-described embodiments, when the digest-image-production time is set in the automatic mode and very little time remains for the CM broadcast, the CM images may be produced, as they are, without generating and producing the digest image. At that time, predetermined settings may be made in advance so that the digest image is not produced when the CM-remaining time is five seconds or so. Accordingly, when the CM-remaining time is so little that the user finds it difficult to understand the program contents sufficiently even though the digest image is produced, it becomes possible to omit useless processing, decrease the processing load, and prevent the user from being baffled.

Further, the digest image illustrated in the above-described embodiments may be generated by a broadcast station. Further, the digest image may be shown on an electronic-program list along with the program information, where the electronic-program list is presented by the broadcast station. Subsequently, the broadcast station can provide the user with useful and convenient information. Further, where the broadcast station presents the digest image, the TV receiver 100 can produce the digest image while a CM broadcast is transmitted without performing the above-described digest-image generation processing.

According to the above-described embodiments, all of the digest-image management unit 6, the speaker 8, and the display unit 9 are provided in the TV receiver 100. However, in the case where an HDD recorder is used, the HDD recorder may include at least the digest-image management unit 6. Namely, the HDD recorder may not include the speaker 8 and the display unit 9, and the HDD recorder may be connected to a TV receiver including the speaker 8 and the display unit 9. Further, in the case where a home server (PC) is used, at least the digest-image management unit 6 should be provided therein. In that case, functions other than the digest-image management unit 6 may be achieved by the TV receiver, or a combination of the TV receiver and the HDD recorder.

It should be understood by those skilled in the art that various modifications, combinations, sub-combinations and alterations may occur depending on design requirements and other factors insofar as they are within the scope of the appended claims or the equivalents thereof.

What is claimed is:

1. An image-processing method comprising the steps of:
  receiving a television broadcast including a television-program broadcast and a plurality of commercial-message broadcasts transmitted during the television-program broadcast;
  detecting whether a commercial-message broadcast is included in the received television broadcast;
  recording images of a television-program broadcast received between the first commercial-message broadcast and a second commercial-message broadcast, the second commercial-message broadcast being a previous commercial-message broadcast received prior to the first commercial-message broadcast, when the detecting step detects a first commercial-message broadcast in the currently received television broadcast;
  generating a summary image including a video obtained by extracting the recorded images of the television-program broadcast at predetermined time intervals, and for joining the extracted images to each other; and
  producing the summary image for a predetermined display time, wherein, when an automatic mode is selected by a user, the predetermined time intervals and the predetermined display time are automatically determined based on a remaining time information indicating when the detected first commercial-message broadcast is finished.

2. An image-processing device comprising:

a reception unit that receives an image of a television broadcast and performs display control, the television broadcast including a television-program broadcast and a plurality of commercial-message broadcasts transmitted during the television-program broadcast;

detecting unit that detects whether a commercial-message broadcast is included in the received television broadcast;

a recording unit that, when the detecting unit detects a first commercial-message broadcast in the currently received television broadcast, records the images of a television-program broadcast received between the first commercial-message broadcast and a second commercial-message broadcast, the second commercial-message broadcast being a previous commercial-message broadcast received prior to the first commercial-message broadcast;

generation unit that generates a summary image including a video obtained by extracting the recorded images of the television-program broadcast at predetermined time intervals, and that joins the extracted images to each other; and a transmission unit that transmits the summary image to the reception device so that the reception device produces the summary image for a predetermined display time while receiving the commercial-message broadcast, wherein, when an automatic mode is selected by a user, the predetermined time intervals and the predetermined display time are automatically determined based on a remaining time information indicating when the detected first commercial-message broadcast is finished.

3. An image-processing device comprising:

reception means for receiving an image of a television broadcast and for performing display control, the television broadcast including a television-program broadcast and a plurality of commercial-message broadcasts transmitted during the television-program broadcast;

detecting means for detecting whether a commercial-message broadcast is included in the received television broadcast;

recording means for, when the detecting means detects a first commercial-message broadcast in the currently received television broadcast, recording images of a television-program broadcast received between the first commercial-message broadcast and a second commercial-message broadcast, the second commercial-message broadcast being a previous commercial-message broadcast received prior to the first commercial-message broadcast;

generation means for generating a summary image including a video obtained by extracting the recorded images of the television-program broadcast at predetermined time intervals, and for joining the extracted images to each other; and transmission means for transmitting the summary image to the reception device so that the reception device produces the summary image for a predetermined display time while receiving the commercial-message broadcast, wherein, when an automatic mode is selected by a user, the predetermined time intervals and the predetermined display time are automatically determined based on a remaining time information indicating when the detected first commercial-message broadcast is finished.

4. An electronic device comprising:

reception means for receiving a signal including a program and a plurality of commercial message inserted into the program;

detecting means for detecting whether a commercial-message is included in the received signal;

recording means for, when the detecting means detects a first commercial-message in the currently received signal, recording images of a program received between the first commercial-message and a second commercial-message, the second commercial-message being a previous commercial-message received prior to the first commercial-message;

generation means for generating a summary image including a video obtained by extracting the recorded images of the program at predetermined time intervals, and for joining the extracted images to each other; and display-control means for producing the received signal and for producing the summary image for a predetermined display time, wherein, when an automatic mode is selected by a user, the predetermined time intervals and the predetermined display time are automatically determined based on a remaining time information indicating when the detected first commercial-message is finished.

5. An electronic device comprising:

a reception unit that receives a television broadcast including a television-program broadcast and a plurality of commercial-message broadcasts transmitted during the television-program broadcast;

a detecting unit that detects whether a commercial-message broadcast is included in the received television broadcast;

a recording unit that, when the detecting unit detects a first commercial-message broadcast in the currently received television broadcast, records images of a television-program broadcast received between the first commercial-message broadcast and a second commercial-message broadcast, the second commercial-message broadcast being a previous commercial-message broadcast received prior to the first commercial-message broadcast;

generation unit that generates a summary image including a video obtained by extracting the recorded images of the television-program broadcast at predetermined time intervals, and that joins the extracted images to each other; and a display-control unit that produces the images of the received television broadcast and produces the summary image for a predetermined display time, wherein, when an automatic mode is selected by a user, the predetermined time intervals and the predetermined display time are automatically determined based on a remaining time information indicating when the detected first commercial-message broadcast is finished.

6. An electronic device comprising:

a reception unit that receives a signal including a program and a plurality of commercial message inserted into the program;

detecting unit that detects whether a commercial-message is included in the received signal;

a recording unit that, when the detecting unit detects a first commercial-message in the currently received signal, records images of a program received between the first commercial-message and a second commercial-message, the second commercial-message being a previous commercial-message received prior to the first commercial-message;

generation unit that generates a summary image including a video obtained by extracting the recorded images of the program at predetermined time intervals, and that joins the extracted images to each other; and a display-control unit that produces the received signal and produces the summary image for a predetermined display time,
wherein, when an automatic mode is selected by a user, the predetermined time intervals and the predetermined display time are automatically determined based on a remaining time information indicating when the detected first commercial-message is finished.

7. An electronic device comprising:
reception means for receiving a television broadcast including a television-program broadcast and a plurality of commercial-message broadcasts transmitted during the television-program broadcast;

detecting means for detecting whether a commercial-message broadcast is included in the received television broadcast;

recording means for, when the detecting means detects a first commercial-message broadcast in the currently received television broadcast, recording images of a television-program broadcast received between the first commercial-message broadcast and a second commercial-message broadcast, the second commercial-message broadcast being a previous commercial-message broadcast received prior to the first commercial-message broadcast;

generation means for generating a summary image including a video obtained by extracting the recorded images of the television-program broadcast at predetermined time intervals, and for joining the extracted images to each other; and display-control means for producing the image of the received television broadcast and for producing the summary image for a predetermined display time,
wherein, when an automatic mode is selected by a user, the predetermined time intervals and the predetermined display time are automatically determined based on a remaining time information indicating when the detected first commercial-message broadcast is finished.

8. The electronic device according to claim 7,
wherein when the remaining time information is less than a predetermined value, the summary image is not produced.

9. The electronic device according to claim 7,
wherein, when a fixed mode is selected by the user, the predetermined time intervals is determined as a fixed value.

10. The electronic device according to claim 7, wherein the generation means comprises:
extracting means for extracting part of each of the extracted images, as a still image; and
downsizing means for downsizing each of the extracted still images,
wherein the display-control means arranges and produces the downsized still images.

11. The electronic device according to claim 10, wherein the downsized still images are arranged and produced in matrix form.

12. The electronic device according to claim 7,
wherein the recording means records speech of the television-program broadcast, and
wherein the generation means comprises:
identifying means for identifying program contents of the television-program broadcast on the basis of at least one of the recorded image and the recorded speech, and
the generation means generates the summary image on the basis of an identification result obtained by the identifying means.

13. The electronic device according to claim 7, wherein the image of the first commercial-message broadcast which is currently received and the recorded image are produced at the same time.

14. The electronic device according to claim 13, wherein the produced summary image is faded out as the currently received commercial-message broadcast is finished and the television-program broadcast is restarted.

15. The electronic device according to claim 7, wherein the produced summary image is switched to an image of the television-program broadcast which is restarted at the same time as when the currently received commercial-message broadcast is finished and the television-program broadcast is restarted.

16. The electronic device according to claim 7, wherein after a predetermined time elapses since the currently received commercial-message broadcast is finished and the television-program broadcast is restarted, the produced summary image is switched to an image of the restarted television-program broadcast.

17. The electronic device according to claim 7,
wherein the reception means receives a first-channel television broadcast and a second-channel television broadcast, and
wherein the produced image of the received television broadcast is switched between the first-channel television broadcast and the second-channel television broadcast,
the electronic device further comprising storage means for storing information about time where a commercial-message broadcast is finished in advance, the commercial-message broadcast being scheduled to be performed on the first channel and/or the second channel,
wherein when a display channel is switched from the first channel to the second channel by the display-control means and the commercial-message broadcast is received on the second channel, the generation means generates the summary image from the recorded image on the basis of the stored finish-time information, where the summary image corresponds to a time period from the channel switch to the finish time.

18. The electronic device according to claim 7, wherein the display-control means further produces text information and/or image information, the produced text information and/or the image information indicating that the recorded image is currently produced.

19. The electronic device of claim 7, further comprising a user-selectable fixed mode, whereby:
when the user selects the fixed mode from among the fixed mode and the automatic mode, the generated summary images produced under the selected fixed mode provide a processing load decrease compared the generated summary images produced under the selected automatic mode.

20. The electronic device of claim 7 wherein the generation means comprises additional types of summary images, the additional types including:
   first summary images generated by extracting a plurality of still images of scenes from the recorded images of the television-program broadcast, the plurality of still images arranged in a matrix form; and
   second summary images generated by extracting a predefined interval of the broadcast associated with the recorded images of the television-program broadcast.

* * * * *